(12) United States Patent
Bilogrevic et al.

(10) Patent No.: US 9,792,432 B2
(45) Date of Patent: Oct. 17, 2017

(54) METHOD AND APPARATUS FOR PRIVACY-ORIENTED CODE OPTIMIZATION

(71) Applicant: NOKIA TECHNOLOGIES OY, Espoo (FI)

(72) Inventors: Igor Bilogrevic, Renens VD (CH); Kevin Huguenin, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 268 days.

(21) Appl. No.: 13/673,410

(22) Filed: Nov. 9, 2012

(65) Prior Publication Data
US 2014/0137264 A1    May 15, 2014

(51) Int. Cl.
G06F 21/54    (2013.01)
G06F 21/60    (2013.01)
G06F 21/10    (2013.01)

(52) U.S. Cl.
CPC .............. *G06F 21/54* (2013.01); *G06F 21/10* (2013.01); *G06F 21/60* (2013.01)

(58) Field of Classification Search
CPC ........... G06F 21/60; G06F 21/10; G06F 21/54
USPC ...................................... 726/23, 27; 379/31
See application file for complete search history.

(56) References Cited

U.S. PATENT DOCUMENTS

| | | | |
|---|---|---|---|
| 5,579,520 A * | 11/1996 | Bennett | 717/151 |
| 7,424,744 B1 * | 9/2008 | Wu et al. | 726/23 |
| 7,493,659 B1 * | 2/2009 | Wu et al. | 726/26 |
| 7,640,587 B2 * | 12/2009 | Fox et al. | 726/24 |
| 7,765,525 B1 * | 7/2010 | Davidson | G06F 11/3624 717/110 |
| 7,797,545 B2 * | 9/2010 | Adams et al. | 713/179 |
| 7,962,959 B1 * | 6/2011 | Batenin | 726/24 |
| 8,239,948 B1 * | 8/2012 | Griffin | H04L 63/1416 726/22 |
| 8,572,742 B1 * | 10/2013 | Linhardt | 726/24 |
| 8,612,995 B1 * | 12/2013 | Yun | G06F 13/00 719/313 |
| 8,826,444 B1 * | 9/2014 | Kalle | H04N 21/25816 709/223 |
| 2002/0026634 A1 * | 2/2002 | Shaw | 717/173 |

(Continued)

OTHER PUBLICATIONS

Notification of Transmittal of the International Search Report and The Written Opinion of The International Searching Authority, or The Declaration; International Search Report; Written Opinion for corresponding Application No. PCT/FI2013/051008, dated Jan. 23, 2014, 15 pages.

*Primary Examiner* — Hadi Armouche
*Assistant Examiner* — Shahriar Zarrineh
(74) *Attorney, Agent, or Firm* — Ditthavong & Steiner, P.C.

(57) ABSTRACT

Methods and apparatuses are provided for automatically optimizing application program code for minimized access to privacy data. A privacy-oriented code optimizing module process and/or facilitate a processing one or more code segments, one or more execution logs associated with the one or more code segments, or a combination thereof to determine at least one privacy intrusion signature associated with the one or more code segments. Further, the privacy-oriented code optimizing module determines one or more recommendations for one or more alternate code segments based, at least in part, on the at least one privacy intrusion signature.

20 Claims, 12 Drawing Sheets

(56) References Cited

U.S. PATENT DOCUMENTS

| | | | |
|---|---|---|---|
| 2002/0173317 A1 | 11/2002 | Nykanen et al. | |
| 2005/0182967 A1* | 8/2005 | Phillips et al. | 713/201 |
| 2005/0268338 A1* | 12/2005 | Made | 726/24 |
| 2006/0041837 A1 | 2/2006 | Amir et al. | |
| 2006/0230449 A1* | 10/2006 | Fox et al. | 726/22 |
| 2006/0294514 A1* | 12/2006 | Bauchot et al. | 717/173 |
| 2007/0028111 A1* | 2/2007 | Covely | 713/176 |
| 2007/0240221 A1* | 10/2007 | Tuvell et al. | 726/24 |
| 2007/0280511 A1* | 12/2007 | Nepomniachtchi | G06K 9/00154 382/119 |
| 2008/0037791 A1* | 2/2008 | Jakobsson | 380/278 |
| 2008/0052527 A1* | 2/2008 | Siedlarz | G06F 21/32 713/186 |
| 2008/0086657 A1* | 4/2008 | Chen et al. | 714/3 |
| 2008/0127336 A1* | 5/2008 | Sun et al. | 726/22 |
| 2009/0044663 A1* | 2/2009 | Stevens | E21B 10/43 76/108.2 |
| 2009/0328185 A1* | 12/2009 | Berg et al. | 726/13 |
| 2010/0180344 A1* | 7/2010 | Malyshev et al. | 726/23 |
| 2010/0235877 A1* | 9/2010 | Hu et al. | 726/1 |
| 2011/0010697 A1* | 1/2011 | Golovkin | 717/155 |
| 2011/0078655 A1 | 3/2011 | Amir et al. | |
| 2011/0167474 A1* | 7/2011 | Sinha et al. | 726/1 |
| 2012/0110174 A1 | 5/2012 | Wootton et al. | |
| 2012/0167219 A1* | 6/2012 | Zaitsev et al. | 726/24 |
| 2012/0304310 A1* | 11/2012 | Blaisdell | 726/28 |
| 2013/0042294 A1* | 2/2013 | Colvin et al. | 726/1 |
| 2013/0122861 A1* | 5/2013 | Kim et al. | 455/410 |

\* cited by examiner

METHOD AND APPARATUS FOR PRIVACY-ORIENTED CODE OPTIMIZATION

BACKGROUND

Service providers and device manufacturers (e.g., wireless, cellular, etc.) are continually challenged to deliver value and convenience to consumers by, for example, providing compelling network services and applications capable of personalization. In many instances, the consumers utilize a range of applications on their devices, for example mobile devices, for performing various tasks and/or accessing various personalized services. Such personalization may depend on various applications/programs being granted some level of access to user and device privacy data, for example, geo-location, list of contacts, pictures, activities, applications in use, and the like. Traditionally, developers prioritize performance and development time of the applications over requirements for using the privacy data in order to simplify the development. For example, they may access more private data, directly or via Application Programming Interface (API) calls, than the applications may actually need, thus unnecessarily compromising a user's privacy. Accordingly, the application developers, service providers, and device manufacturers are challenged to develop new mechanisms for effectively and efficiently preserving user privacy without sacrificing application functionality, personalization, and user experience.

Some Example Embodiments

Therefore, there is a need for an approach for automatically optimizing application program code for minimized access to privacy data.

According to one embodiment, a method comprises processing and/or facilitating a processing of one or more code segments, one or more execution logs associated with the one or more code segments, or a combination thereof to determine at least one privacy intrusion signature associated with the one or more code segments. The method also comprises determining one or more recommendations for one or more alternate code segments based, at least in part, on the at least one privacy intrusion signature.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of one or more code segments, one or more execution logs associated with the one or more code segments, or a combination thereof to determine at least one privacy intrusion signature associated with the one or more code segments. The apparatus is also caused to determine one or more recommendations for one or more alternate code segments based, at least in part, on the at least one privacy intrusion signature.

According to another embodiment, a computer-readable storage medium carries one or more sequences of one or more instructions which, when executed by one or more processors, cause, at least in part, an apparatus to process and/or facilitate a processing of one or more code segments, one or more execution logs associated with the one or more code segments, or a combination thereof to determine at least one privacy intrusion signature associated with the one or more code segments. The apparatus is also caused to determine one or more recommendations for one or more alternate code segments based, at least in part, on the at least one privacy intrusion signature.

According to another embodiment, an apparatus comprises means for processing and/or facilitating a processing of one or more code segments, one or more execution logs associated with the one or more code segments, or a combination thereof to determine at least one privacy intrusion signature associated with the one or more code segments. The apparatus also comprises means for determining one or more recommendations for one or more alternate code segments based, at least in part, on the at least one privacy intrusion signature.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for automatically optimizing application program code for minimized access to privacy data. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
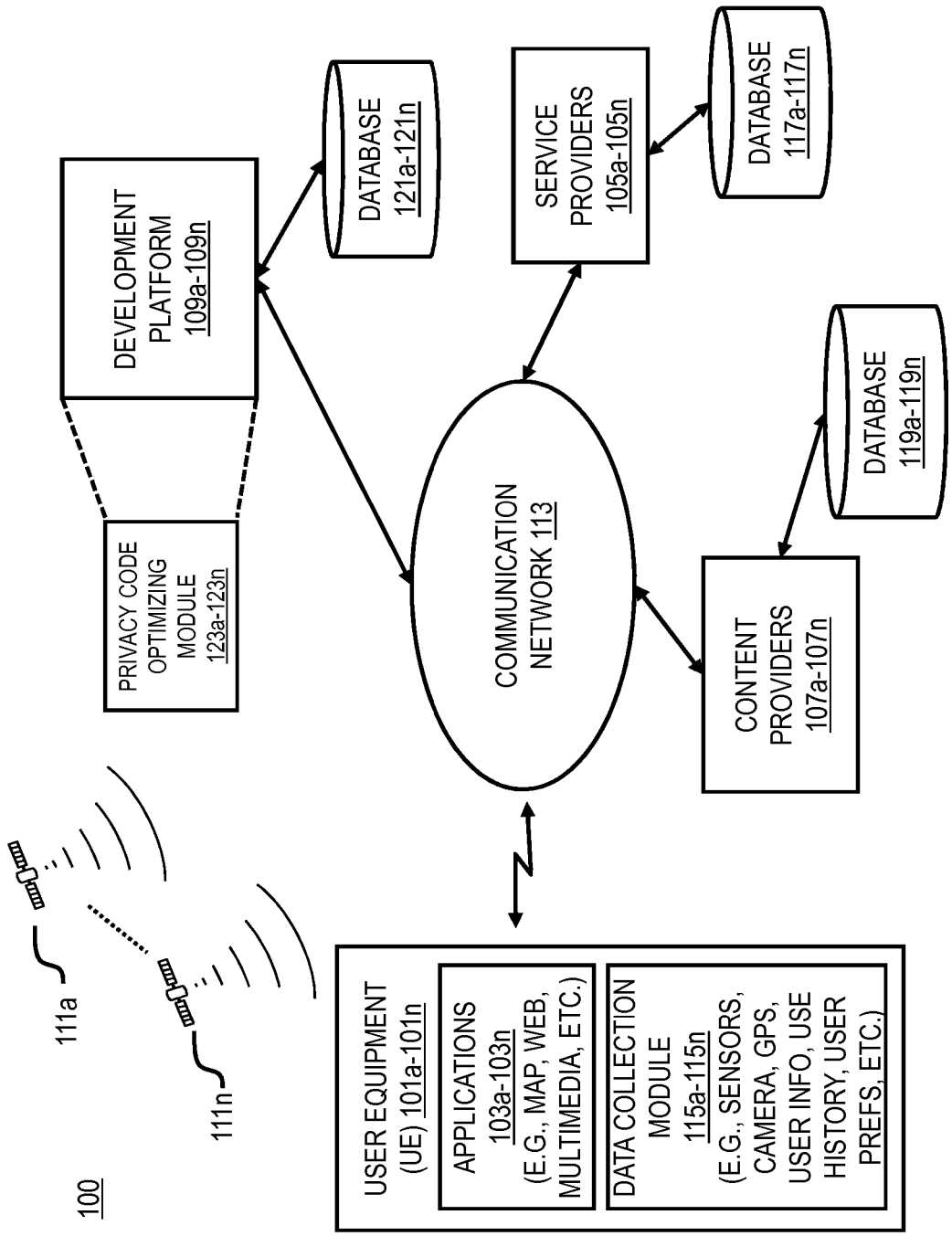
FIG. 1 is a diagram of a system capable of automatically optimizing application program code for minimized access to privacy data, according to an embodiment.

FIG. 1 is a diagram of a system capable of automatically optimizing application program code for minimized access to privacy data, according to an embodiment. As discussed above, users may utilize highly capable and complex devices (e.g., mobile phones, tablets, etc.) for productivity, entertainment, information, and other tasks throughout the day. In many instances, the devices may include a plurality of native applications/programs and/or a user of the device may obtain/install third party applications for a variety of services and functionalities on the device. Additionally, the devices may include and/or employ a range of sensors for collecting data associated with the user, a device, an environment of the user and the device, etc., wherein the data may be actively determined via the sensors or may be accessed via stored data at the device, at another device, and/or at a service provider (e.g., cloud services). For example, a user may use a device including a location sensor (e.g., a Global Positioning System (GPS) receiver) for location data, and a map application for navigating through a city or requesting weather reports associated the location data. As such, the devices may be a source for rich personal data (privacy data) store including but not limited to, contacts, schedules/calendars, pictures, video, location, location tags, travel routes, and the like, wherein application usage, implemented over a rich personal data store, can create a serious risk to user privacy and security, whereby the applications may access user data and transmit it elsewhere to be shared and/or mined without user consent or even user awareness. As mentioned, in order to simplify the development process of various applications, developers may prioritize performance and development time of the applications over requirements for avoiding intrusive use of the privacy data by the applications. In one instance, an application's intrusiveness may be reflected by how the application requests/accesses privacy data, for example, frequency of access, accuracy of the data (e.g., granularity), amount of data, type of data, and the like. As such, the devices may be a source for rich personal data store including but not limited to, contacts, schedules/calendars, pictures, video, location, location tags, travel routes, and the like, wherein application usage, implemented over a rich personal data store, can create a serious risk to user privacy and security, whereby the applications may access privacy data and transmit it elsewhere to be shared and/or mined without user consent or even user awareness.

To address, at least these problems, a system 100 of FIG. 1 introduces the capability for automatically optimizing application program code for minimized access to privacy data. More specifically, application developers may utilize the methods of the system 100 to substantially automatically monitor, process, analyze, and optimize one or more program code segments of an application. For instance, one or more of said processes may be performed by one or more mechanisms/features included in an integrated development environment (IDE) for application development. In general, there may be various sources/methods whereby one or more functions of an application may be deemed intrusive. In one example, a function or a module in an application may cause an unnecessary access to privacy data via an ad-hoc function/method instead of an API call which may be designed for that specific purpose. In one use case, an application may implement a "manually" an auto-completion feature by accessing the entirety of a user's contacts/address book, instead of using a dedicated API call which could provide the same functionality to the user while disclosing only information about the selected entry in the contact/address book.

In one instance, analysis of one or more code segments may indicate that there is redundant access and/or sub-optimal access to private data, which may have not changed between the successive accesses, for example, location information of a user/device would not significantly change within a few milliseconds. In the following example code segment, unnecessary re-accesses can lead to a degraded privacy intrusion score/value for an application that may employ a similar code segment:

---

If (distance(getPositionGPS( ),city1) > threshold1 AND
distance(getPositionGPS( ),city2) > threshold2).

In one embodiment, the system 100 can analyze the code segment for determining the access type, frequency, and other characteristics so that one or more alternate code segments may be determined and recommended, for example to a developer of an application, for use instead of the original code segment.

In another instance, an application may access private data with unnecessarily high accuracy or precision (e.g., very precise GPS coordinates), where less accurate, coarse-grained information would suffice. For example, to provide a local weather forecast, an application can use a zip code or cell-tower-based location information instead of precise/accurate GPS location information. In one embodiment, application accuracy of required information is analyzed and one or more alternate code segments are and presented, whereby the accuracy is sufficient enough for the application to render intended services. In one example, a given application may include a code segment comprising:

display ("The weather in"+c+"is"+w)
where
x=getPositionGPS( )
c=getCityFromPosition(x)
w=getWeatherInCity(c)

In one instance, the system 100 may recommend utilization of an API call which can obtain location information for the given city and/or at least request for the location information having a lower accuracy than the user GPS location information.

In another instance, a code segment may cause access to privacy data where the data is not subsequently used. For example, an application accesses the GPS location information of a user and stores it in a program/application variable where the variable is either not read (e.g., by a code segment beyond that variable point in the code) or the variable is overwritten/updated before it is read. In one embodiment, a code segment may be statically analyzed, wherein use/access of one or more application variables that include privacy data may be dynamically monitored. In one embodiment, privacy data and/or access to a variable including the privacy data may be analyzed for determining old/stale data based on lapsed time since last access and/or update. For instance, an application accesses the GPS location information of a user but only uses it ten minutes later, wherein a code segment which may access the cell-tower-based location information may provide sufficient accuracy.

In another instance, however, an application may request access to privacy data that may be for valid reasons, for example, the application may request to scan all nearby WiFi access points (APs) in order to connect to one of them, but by doing so the application and/or one or more other applications and services may be able to determine location information of the user. In such a case, a privacy score of the application may be lower, wherein it may utilize an the following example code segment:

--- nearbySSIDs = getSSID( )
currentSSID = "Ask user to select a WiFi SSID among nearbySSIDs"
connect(currentSSID)

---

In one embodiment, one or more alternate code segments may be determined and presented whereby an equivalent API function may be proposed or, at least, a warning message may be presented in the IDE.

In one instance, a code segment may actively poll privacy data (e.g., repeatedly checking location information of a user or a contact in an address book entry) to determine an event, for example, instead of using the following:

While(distance(getPositionGPS( ),city1)<radius1){sleep 5 seconds} a dedicated event-triggered APIs may be utilized; for example use:

NotifyWhenUserLeavesArea(city1, radius1)

which is performed by an operating system at lower layers without the location information being passed to the application.

As shown in FIG. 1, in one embodiment, the system 100 includes user equipment (UE) 101a-101n (also collectively referred to as UE 101 and/or UEs 101), which may be utilized to execute one or more applications 103a-103n (also collectively referred to as applications 103) including social networking, web browser, multimedia applications, user interface (UI), map application, web client, etc. to communicate with other UEs 101, one or more service providers 105a-105n (also collectively referred to as service providers 105), one or more content providers 107a-107n (also collectively referred to as content providers 107), one or more development platforms 109a-109n (also collectively referred to as development platform 109), one or more GPS satellites 111a-111n (also collectively referred to as GPS satellites 111), and/or with other components of the system 100 directly and/or via communication network 113. In one embodiment, the UEs 101 may include data/content collection modules 115a-115n (also collectively referred to as DC collection module 115) for determining and/or collecting data and/or content associated with the UEs 101, one or more users of the UEs 101, applications 103, one or more content items (e.g., multimedia content), and the like. In addition, the UEs 101 can execute an application 103 that is a software client for storing, processing, and/or forwarding one or more information items to other components of the system 100.

In one embodiment, the service providers 105 may include and/or have access to one or more databases 117a-117n (also collectively referred to as database 117), which may include various user information, user profiles, user preferences, one or more profiles of one or more user devices (e.g., device configuration, sensors information, etc.), service providers 105 information, other service providers' information, and the like. In one embodiment, the service providers 105 may include one or more service providers offering one or more services, for example, online shopping, social networking services (e.g., blogging), media upload, media download, media streaming, account management services, or a combination thereof. Further, the service providers 105 may conduct a search for content items, media items, information, coupons, and the like associated with one or more users, POIs, geo-locations, and the like.

In one embodiment, the content providers 107 may include and/or have access to one or more database 119a-119n (also collectively referred to as database 119), which may store, include, and/or have access to various content items. For example, the content providers 107 may store content items (e.g., at the database 119) provided by various users, various service providers, crowd-sourced content, and the like.

In one embodiment, the development platform 109 may include and/or have access to a one or more database 121a-121n (also collectively referred to as database 121) to access and/or store information associated with various applications, code segments, execution logs, code signatures, application signatures, and the like. It is noted that the development platform 109 may be a stand-alone entity in the system 100 (e.g., on a computer, on a server, etc.), a part of the service providers 105, a part of the content providers 107, included within the UE 101 (e.g., as part of the applications 103), or a combination thereof. In one embodiment, the development platform 109 may include and/or have access to one or more code optimizing modules 123a-123n (also collectively referred to as code optimizing module 123), wherein the code optimizing module 123 may include one or more software, hardware, firmware, algorithms, compilers, analyzers, and the like for performing one or more processes in development of various applications, programs, source codes, and the like. In one embodiment, the development platform 109 and/or the code optimizing module 123 may be implemented, within an IDE, on a computer system comprising one or more computers, processors, servers, storage devices, etc. For example, various applications/programs may be developed (e.g., analyzed, simulated, tested, debugged, etc.) on the development platform 109, wherein the applications/programs may be made available via one or more content and/or service providers to users for utilization (e.g., execute/run) on various user devices, for example, mobile phones, tablets, laptops, and the like. Further, the development platform 109, the service providers 105, and/or the content providers 107 may utilize one or more service application programming interfaces (APIs)/integrated interface, through which communication, media, content, and information (e.g., associated with users, applications, services, content, etc.) may be shared, accessed and/or processed.

The UEs 101 may be any type of mobile terminal, fixed terminal, or portable terminal including a mobile handset, station, unit, device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, loud speakers, display monitors, radio broadcast receiver, electronic book device, game device, wrist watch, or any combination thereof, including the accessories and peripherals of these devices, or any combination thereof. It is also contemplated that the UEs can support any type of interface to the user (such as "wearable" circuitry, etc.) Further, the UEs 101 may include various sensors for collecting data associated with a user, a user's environment, and/or with a UE 101, for example, the sensors may determine and/or capture audio, video, images, atmospheric conditions, device location, user mood, ambient lighting, user physiological information, device movement speed and direction, and the like.

In one embodiment, the UE 101 includes a location module/sensor that can determine the UE 101 location (e.g., a user's location). The UE 101 location may be determined by a triangulation system such as a GPS, assisted GPS (A-GPS), Cell of Origin, wireless local area network triangulation, or other location extrapolation technologies. Standard GPS and A-GPS systems can use the one or more satellites 111 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module/sensor may also utilize multiple technologies to detect the location of the UE 101. GPS coordinates can provide finer detail as to the location of the UE 101. In another embodiment, the UE 101 may utilize a local area network (e.g., LAN, WLAN) connection to determine the UE 101 location information, for example, from an Internet source (e.g., a service provider).

In one embodiment, the system 100 processes and/or facilitates a processing of one or more code segments, one or more execution logs associated with the one or more code segments, or a combination thereof to determine at least one privacy intrusion signature associated with the one or more code segments. In one embodiment, the code optimizing module 123 may process the one or more code segments to generate the one or more associated execution logs. In one embodiment, the one or more execution logs may be available via one or more other modules, one or more libraries, one or more content providers, one or more service providers, and the like. In one embodiment, the code optimizing module 123 may execute/run (e.g., simulate) the one or more code segments to determine functionality of the one or more code segments, for example, associated with accessing and/or request for accessing privacy data associated with a user and/or a device. In one embodiment, one or more privacy intrusion signatures may be determined for the one or more code segments based, at least in part, on the functionality of the one or more code segments, the accessing and/or the request for accessing the privacy data, or a combination thereof. In one embodiment, the privacy intrusion signature may be based on the one or more execution logs associated with the one or more code segments. For example, an execution log may include one or more information items associated with one or more corresponding code segments, wherein the functionality of and/or access to privacy data by the one or more code segments are indicated.

In one embodiment, the system 100 determines one or more recommendations for one or more alternate code segments based, at least in part, on the at least one privacy intrusion signature. In one embodiment, the code optimizing module 123 may determine and recommend to a developer one or more alternate code segments for replacing the one or more code segments (e.g., original/current code segments), wherein the one or more alternate code segments may have a different (e.g., better) privacy intrusion signature. In one embodiment, the one or more recommendations are determined based, at least in part, on one or more privacy rules associated with one or more users, one or more service providers, one or more content providers, or a combination thereof. In one embodiment, the one or more alternate code segments may be available from one or more libraries, one or more service providers, one or more content providers, and the like.

In one embodiment, the system 100 determines one or more code patterns in the one or more code segments, wherein the one or more code patterns are associated with one or more privacy data accesses, and wherein the at least one privacy intrusion signature is based, at least in part, on the one or more code patterns. In one embodiment, the code optimizing module 123 may process the one or more code segments for determining one or more code patterns therein. For example, the one or more code segments may include certain function calls (e.g., API calls), certain processes, certain executions, etc., which may cause access to various privacy data and which may result in certain privacy intrusion signatures for the one or more code segments. For example, a code segment may request access to location information of a device via a particular method for determining the location information, which may have a certain privacy intrusion signature associated with that particular method. In one embodiment, the one or more alternate code segments cause, at least in part, one or more alterations in the processing of the privacy data, collecting of the privacy data, storing of the privacy data, accessing of the privacy data, parsing of the privacy data, granularity of the privacy data, or a combination thereof. For example, the one or more alternate code segments may cause access to the privacy data less frequently and/or with a coarser granularity, or may cause storing of the privacy data for a shorter period of time and/or not store at all, or access a different type of data but still achieve substantially same results (e.g., access zip code information instead of exact location), and the like.

In one embodiment, the system 100 causes, at least in part, a simulation of an execution of the one or more code segments to generate the one or more execution logs. In one embodiment, the code optimizing module 123 may include and/or have access to one or more programs/application for simulating an execution of the one or more code segments, wherein one or more execution logs are generated. For example, the simulation may be based on one or more parameters associated with one or more applications utilizing the one or more code segments. In one embodiment, the simulating program may be access via one or more modules and/or elements of the system 100.

In one embodiment, the system 100 determines one or more access patterns in the one or more execution logs, wherein the one or more access patterns are associated with one or more privacy data accesses. In one embodiment, the code optimizing module 123 may process the one or more execution logs for determining one or more access patterns, wherein the access patterns may be associated with the one or more code segments causing access to privacy data associated with the user and/or a device. In one embodiment, the at least one privacy intrusion signature is based, at least in part, on the one or more access patterns.

In one embodiment, the system 100 determines one or more reference code segments based, at least in part, on one or more characteristics of the one or more code segments. In one embodiment, the code optimizing module 123 may have access to one or more reference code segments via one or more libraries, one or more content providers, one or more service providers, and the like, wherein the one or more reference code segments may utilized for comparison with the one or more code segments. In one embodiment, the code optimizing module 123 may determine/access the one or more code reference segments based one on one or more characteristics of the one or more code segments. For example, the one or more code segments may include certain functions, certain processing capability, certain code format, certain optimization parameters, and the like, wherein the one or more reference code segments may include similar characteristics.

In one embodiment, the system 100 processes and/or facilitates a processing of the one or more reference code segments to cause, at least in part, a generation of one or more reference privacy intrusion signatures. In one embodiment, the code optimizing module 123 may execute and/or analyze the one or more reference code segments for generating one or more reference privacy intrusion signatures. For example, the one or more reference code segments may be simulated or may be analyzed via a binary code analyzer for generating the one or more reference privacy intrusion signatures.

In one embodiment, the system 100 causes, at least in part, a comparison of the at least one privacy intrusion signature against the one or more reference privacy intrusion signatures. For example, various code segments may be associated with various privacy intrusion signatures based, at least in part, on access, utilization, storage, and the like parameters associated with each code segment. In one instance, the one or more code privacy intrusion signatures are compared to the one or more reference privacy intrusion.

In one embodiment, the system 100 determines the one or more alternate code segments based, at least in part, on the comparison. In one embodiment, the code optimizing module 123 and/or the development platform 109 may determine/select one or more alternate code segments based on one or more comparisons of the one or more code segments with the one or more reference code segments. For example, the comparison may indicate one or more reference code segments that may include better privacy intrusion characteristics (e.g., not as intrusive), may be in a certain coding format, and the like.

In one embodiment, the system 100 determines one or more potential privacy issues associated with the one or more code segments. In one embodiment, the potential privacy issues may be caused by access and/or request access to certain types of privacy data with certain frequencies, or by one or more indications that the privacy data may be shared with others, or by certain processing of the privacy data, and the like.

In one embodiment, the system 100 causes, at least in part, a presentation of a user interface comprising one or more indicators, one or more messages, or a combination thereof for indicating the one or more potential privacy issues and the associated one or more code segments. In one embodiment, the code optimizing module 123 may utilize one or more markers, indicators, and/or messages to highlight one or more code segments which may be associated with one or more potential privacy issues. For example, one or more portions of a code segment may be highlighted to indicate one or more potential issues, wherein one or more messages (e.g., in text) may provide additional information and/or recommendations.

In one embodiment, the system 100 causes, at least in part, a presentation of the one or more alternate code segments associated with the one or more code segments. In one embodiment, the one or more alternate code segments, for example from the reference code segments, may be presented via a UI component of the code optimizing module 123 along with one or more messages, indicators, notifications, and the like for providing additional assistance to the user.

In one embodiment, the system 100 determines one or more inputs from a user to substantially automatically replace the one or more code segments with the one or more alternate code segments. In one embodiment, a UI element of the code optimizing module 123 may determine an input from the user, for example via a keyboard interface, a selection of one or more alternate code segments, wherein the code optimizing module 123 may substantially automatically replace the one or more code segments with the one or more alternate code segments. For example, a user may decide to replace a code segment with an alternate code segment wherein the functionalities of the codes will produce similar results in an application. In one embodiment, a user may select to replace the one or more code segments interactively with the code optimizing module 123.

In one embodiment, the system 100 causes, at least in part, an association of one or more privacy scores with the one or more alternate code segments based, at least in part, on one or more intrusiveness levels associated with the one or more code segments. In one embodiment, the code optimizing module 123 may determine one or more privacy scores for the one or more alternate code segments by executing and/or analyzing the one or more alternate code segments. For example, an alternate code segment may be assigned a different privacy score compared to one or more other alternate code segments, wherein the difference in scores may be due to one or more functions associated with the different alternate code segments. For example, a privacy score may be a relative score (e.g., higher, lower, same, etc.), or indicate a better or worse level, or be on a numeric scale (e.g., 1-5), and the like.

In one embodiment, the system 100 determines the one or more recommendations based, at least in part, on the one or more privacy scores. For example, the code optimizing module 123 may select and recommend one or more alternate code segments based on the privacy scores of each alternate code. In one embodiment, the selection may be determined by one or more parameters associated with an application which will utilize the one or more alternate code segments.

By way of example, the communication network 113 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101, the service providers 105, the content providers 107, and the development platform 109 may communicate with each other and other components of the communication network 113 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the UEs 101 and the development platform 109 may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. It is also noted that the role of a client and a server is not fixed; in some situations a device may act both as a client and a server, which may be done simultaneously and/or the device may alternate between these roles.

Figure 2:
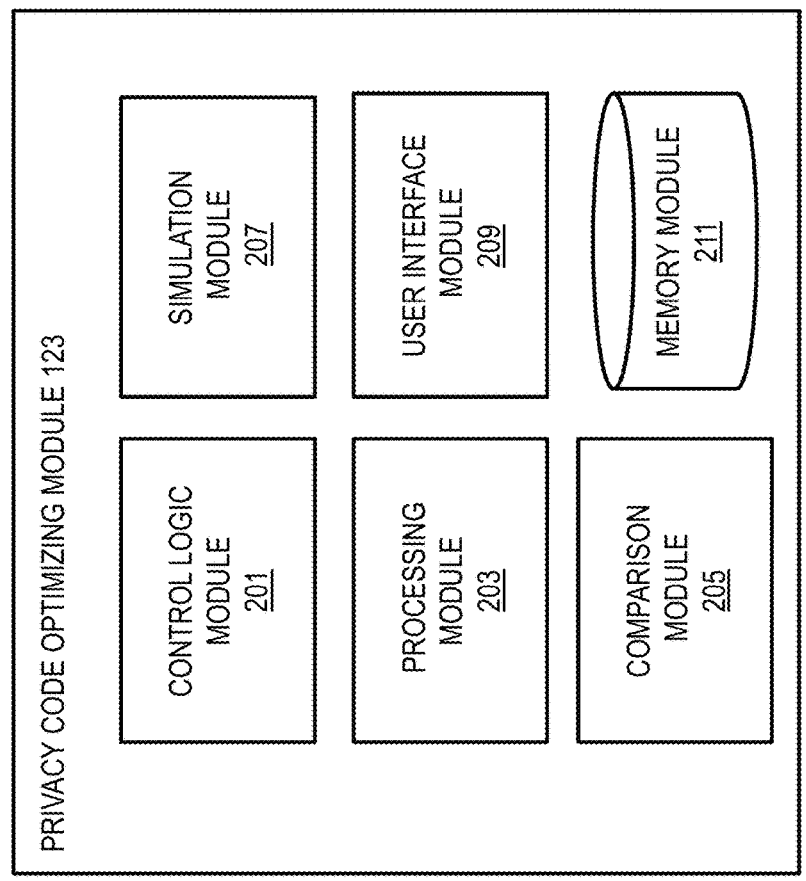
FIG. 2 is a diagram of the components of a privacy-oriented automatic code optimizing module, according to an embodiment.

FIG. 2 is a diagram of the components of a privacy-oriented automatic code optimizing module, according to an embodiment. By way of example, the code optimizing module 123 includes one or more components for processing and analyzing one or more code segments of one or more applications, wherein privacy data associated with a user and/or a device may be accessed, processed, utilized, analyzed, and the like. It is contemplated that the functions of these components may be combined in one or more components or performed by other components of equivalent functionality. In this embodiment, the code optimizing module 123 includes a control logic module 201, a processing module 203, a comparison module 205, a simulation module 207, a user interface module 209, and a memory module 211.

The control logic module 201 oversees tasks, including tasks performed by control logic module 201, the processing module 203, the comparison module 205, the simulation module 207, the user interface module 209, and the memory module 211. For example, although other modules may perform the actual task, the control logic module 201 may determine when and how those tasks are performed or otherwise direct the other modules to perform the tasks.

The processing module 203, may perform one or more processes associated with the development platform 109, wherein one or more code segments are utilized to develop one or more applications, for example, for use in one or more devices. For example, the processing module 203 may analyze a code segment to determine one or more functions performed therein. In one embodiment, the processing module 203 may utilize one or more computer programs (e.g., compilers) that transforms one or more code segments (source code) written in a programming language into another computer language (object code), wherein object code may be executed upon the control logic module 201. In one embodiment, the processing module 203 may determine one or more signatures for one or more code segments, wherein the signatures may be based on one or more characteristics of the one or more code segments. For example, a signature may indicate characteristics of a code segment with reference to utilization of privacy data in an application at a device. In one embodiment, one or more execution logs may be generated for the one or more code segments.

The comparison module 205 may compare the one or more code segments, the one or more associated signatures, one or more functions of the one or more code segments, the one or more characteristics, and the like with one or more code segments available from one or more other sources, for example, from one or more libraries, one or more other applications, one or more other development platforms, and the like. In one instance, a first code segment may be compared with a second code segment, wherein functionalities and/or resultants of the first and second code segments are substantially similar. For example, the first and second code segments include a function to retrieve location information of a device where the code segments may be executed upon, however, methods/functions utilized in each code segment may be different (e.g., calling a different function from a library of available functions.) In one embodiment, the comparison module 205 may compare one or more code segments and provide the results of the comparison to the processing module 203 and/or to one or more other modules/elements of the system 100.

The simulation module 207 may utilize one or more code segments and/or models of the code segments to simulate functionalities of the code segments in given conditions and environment. For example, a simulator may execute a model of a code segment that may include various possible functions for determining a resultant on a given device, a given network, a given library of data, and the like, wherein various characteristics of the code segment may, for example performance, may be determined and shared with the processing module 203, the comparison module 205, and the like.

The user interface (UI) module 209 may provide one or more mechanisms for presenting one or more information items (e.g., messages, indicators, etc.) to a user and/or receive input (e.g., selection) from the developer. In various embodiments, the UI module 209 may receive the one or more information items from the processing module 203, the comparison module 205, the simulation module 207, etc. for presentation to the user. In one embodiment, the UI module 209 may receive an input from the user and/or another module for selecting one or more code segments for processing, altering, substituting, or other functions associated with one or more processes of the code optimizing module 123, the development platform 109, and/or other components of the system 100.

Figure 3:
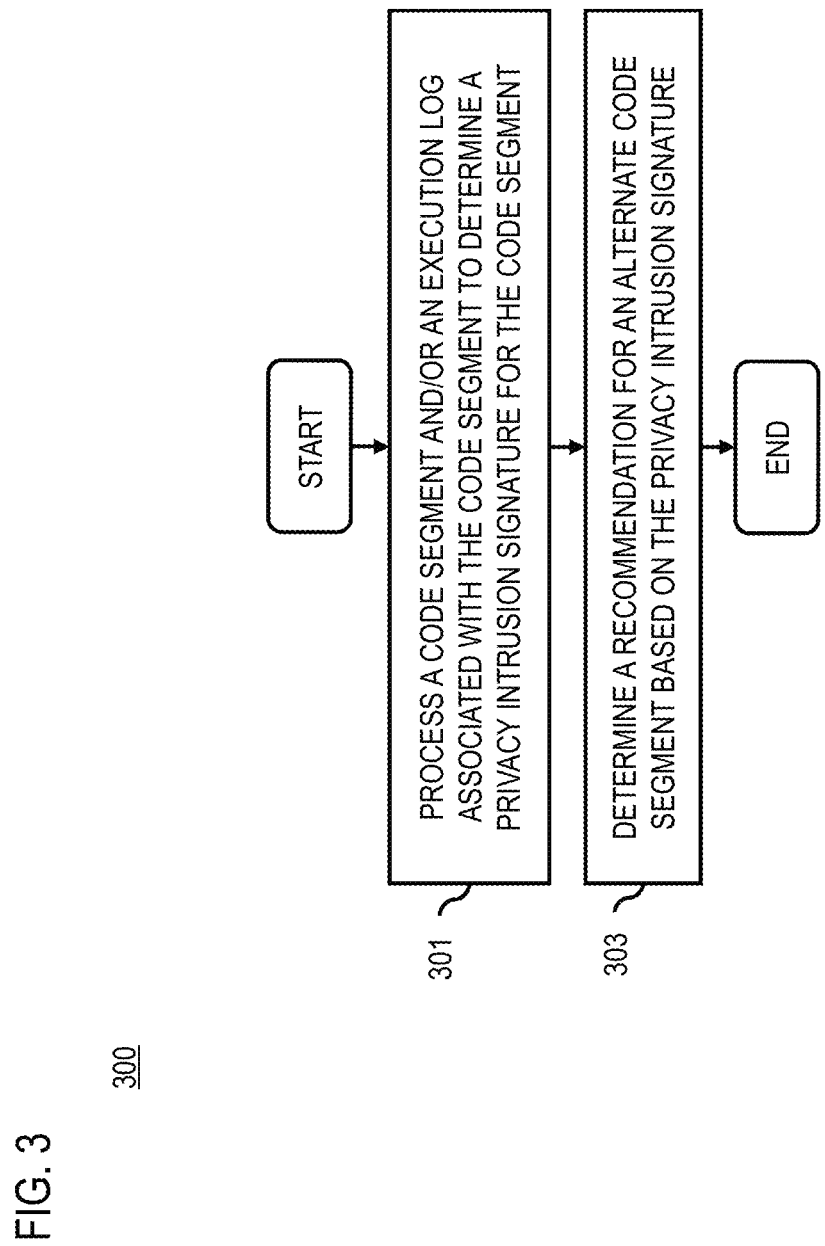
FIG. 3 is a flowchart of a process for, at least, determining privacy intrusion signature of a code segment and recommending an alternate code segment, according to an embodiment.
Figure 9:
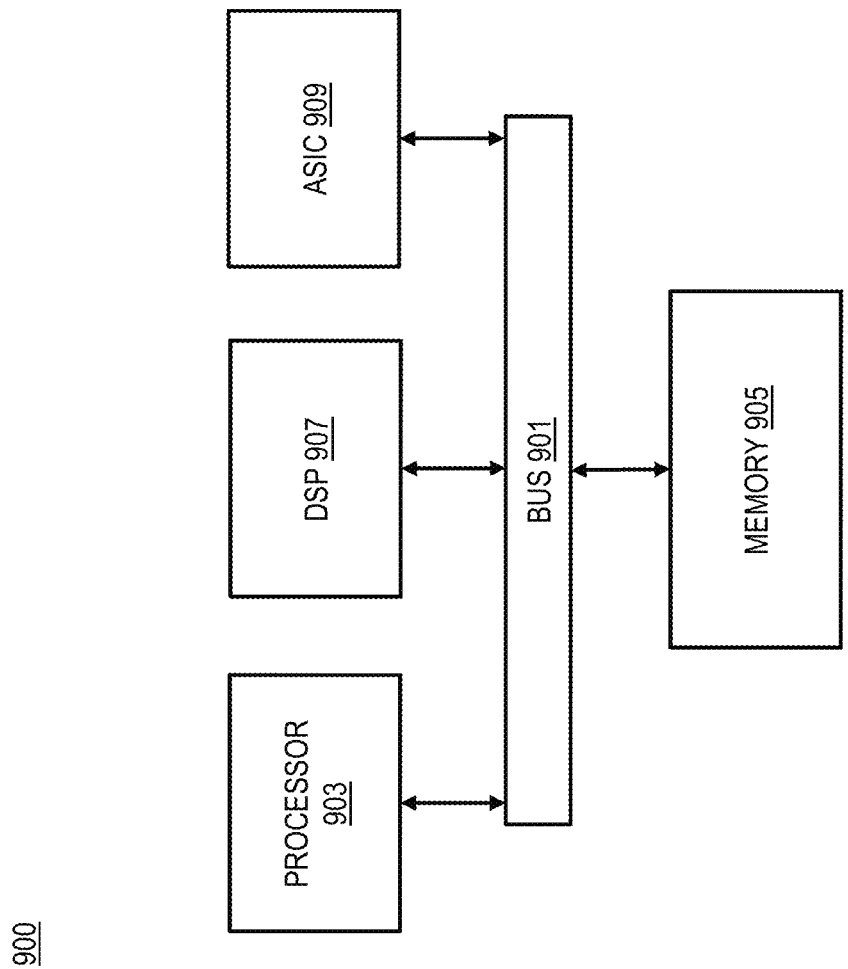
FIG. 9 is a diagram of a chip set that can be used to implement an embodiment of the invention.

FIG. 3 is a flowchart of a process for, at least, determining privacy intrusion signature of a code segment and recommending an alternate code segment, according to an embodiment. In various embodiments, the code optimizing module 123 and/or the development platform 109 may perform the process 300 and may be implemented in, for instance, a chip set including a processor and a memory as shown in FIG. 9. As such, the code optimizing module 123 and/or the development platform 109 can provide means for accomplishing various parts of the process 300 as well as means for accomplishing other processes in conjunction with other components of the system 100. Throughout this process, the code optimizing module 123 is referred to as completing various portions of the process 300, however, it is understood that other components of the system 100 can perform some of and/or all of the process steps. Further, in various embodiments, the code optimizing module 123 may be implemented in one or more entities of the system 100.

In step 301, the code optimizing module 123 processes and/or facilitates a processing of one or more code segments, one or more execution logs associated with the one or more code segments, or a combination thereof to determine at least one privacy intrusion signature associated with the one or more code segments. In one embodiment, the code optimizing module 123 may process the one or more code segments to generate the one or more associated execution logs. In one embodiment, the one or more execution logs may be available via one or more other modules, one or more libraries, one or more content providers, one or more service providers, and the like. In one embodiment, the code optimizing module 123 may execute/run (e.g., simulate) the one or more code segments to determine functionality of the one or more code segments, for example, associated with accessing and/or request for accessing privacy data associated with a user and/or a device. In one embodiment, one or more privacy intrusion signatures may be determined for the one or more code segments based, at least in part, on the functionality of the one or more code segments, the accessing and/or the request for accessing the privacy data, or a combination thereof. In one embodiment, the privacy intrusion signature may be based on the one or more execution logs associated with the one or more code segments. For example, an execution log may include one or more information items associated with one or more corresponding code segments, wherein the functionality of and/or access to privacy data by the one or more code segments are indicated.

In step 303, the code optimizing module 123 determines one or more recommendations for one or more alternate code segments based, at least in part, on the at least one privacy intrusion signature. In one embodiment, the code optimizing module 123 may determine and recommend to a developer one or more alternate code segments for replacing the one or more code segments (e.g., original/current code segments), wherein the one or more alternate code segments may have a different (e.g., better) privacy intrusion signature. In one embodiment, the one or more recommendations are determined based, at least in part, on one or more privacy rules associated with one or more users, one or more service providers, one or more content providers, or a combination thereof. In one embodiment, the one or more alternate code segments may be available from one or more libraries, one or more service providers, one or more content providers, and the like.

Figure 4:
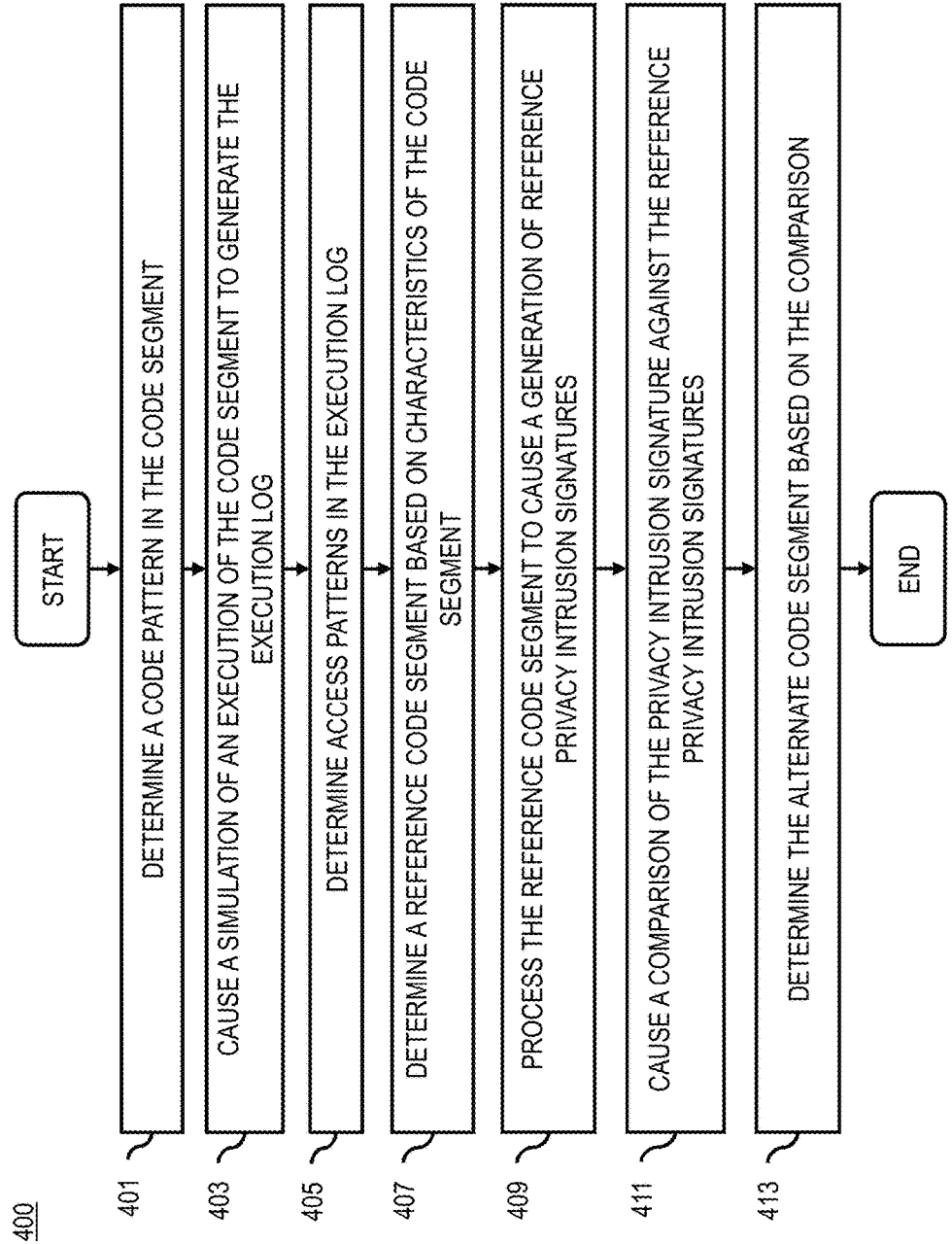
FIGS. 4 and 5 illustrate flowcharts of various processes for, at least, processing and analyzing various code segments, according to various embodiments.
Figure 5:
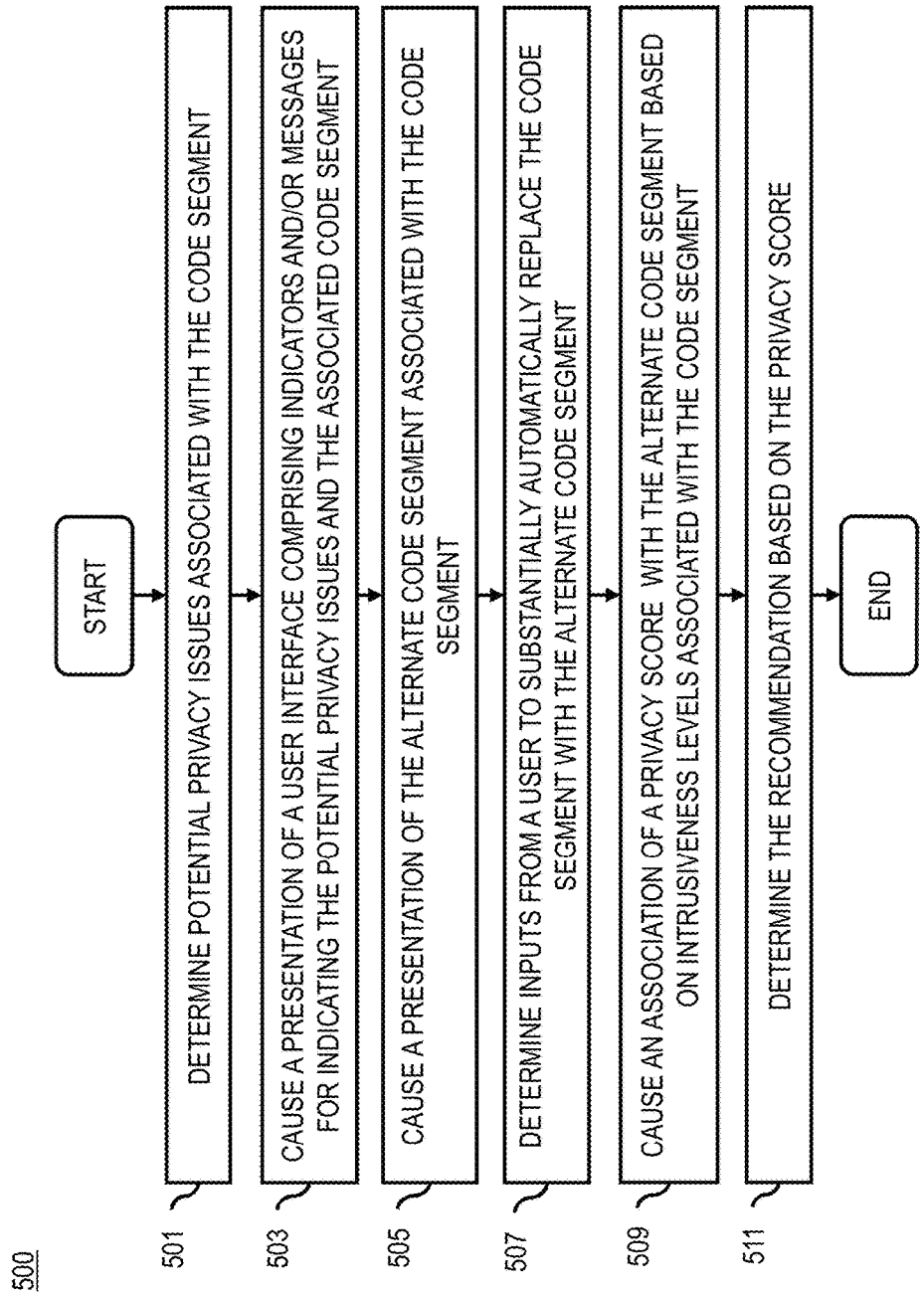

FIGS. 4 and 5 illustrate flowcharts of various processes for, at least, processing and analyzing various code segments, according to various embodiments. In various embodiments, the code optimizing module 123 and/or the development platform 109 may perform processes 400 and 500 that may be implemented in, for instance, a chip set including a processor and a memory as shown in FIG. 9. As such, the code optimizing module 123 and/or the development platform 109 can provide means for accomplishing various parts of the process 400 and 500 as well as means for accomplishing other processes in conjunction with other components of the system 100. Throughout this process, the code optimizing module 123 is referred to as completing various portions of the processes 400 and 500, however, it is understood that other components of the system 100 can perform some of and/or all of the process steps. Further, in various embodiments, the code optimizing module 123 may be implemented in one or more entities of the system 100.

Referring to FIG. 4, the process 400 begins in step 401, where the code optimizing module 123 determines one or more code patterns in the one or more code segments, wherein the one or more code patterns are associated with one or more privacy data accesses, and wherein the at least one privacy intrusion signature is based, at least in part, on the one or more code patterns. In one embodiment, the code optimizing module 123 may process the one or more code segments for determining one or more code patterns therein. For example, the one or more code segments may include certain function calls, certain processes, certain executions, etc., which may cause access to various privacy data and which may result in certain privacy intrusion signatures for the one or more code segments. For example, a code segment may request access to location information of a device via a particular method for determining the location information, which may have a certain privacy intrusion signature associated with that particular method. In one embodiment, the one or more alternate code segments cause, at least in part, one or more alterations in the processing of the privacy data, collecting of the privacy data, storing of the privacy data, accessing of the privacy data, parsing of the privacy data, granularity of the privacy data, or a combination thereof. For example, the one or more alternate code segments may cause access to the privacy data less frequently and/or with a coarser granularity, or may cause storing of the privacy data for a shorter period of time and/or not store at all, or access a different type of data but still achieve substantially same results (e.g., access zip code information instead of exact location), and the like.

In step 403, the code optimizing module 123 causes, at least in part, a simulation of an execution of the one or more code segments to generate the one or more execution logs. In one embodiment, the code optimizing module 123 may include and/or have access to one or more programs/application for simulating an execution of the one or more code segments, wherein one or more execution logs are generated. For example, the simulation may be based on one or more parameters associated with one or more applications utilizing the one or more code segments. In one embodiment, the simulating program may be access via one or more modules and/or elements of the system 100.

In step 405, the code optimizing module 123 determines one or more access patterns in the one or more execution logs, wherein the one or more access patterns are associated with one or more privacy data accesses. In one embodiment, the code optimizing module 123 may process the one or more execution logs for determining one or more access patterns, wherein the access patterns may be associated with the one or more code segments causing access to privacy data associated with the user and/or a device. In one embodiment, the at least one privacy intrusion signature is based, at least in part, on the one or more access patterns.

In step 407, the code optimizing module 123 determines one or more reference code segments based, at least in part, on one or more characteristics of the one or more code segments. In one embodiment, the code optimizing module 123 may have access to one or more reference code segments via one or more libraries, one or more content providers, one or more service providers, and the like, wherein the one or more reference code segments may utilized for comparison with the one or more code segments. In one embodiment, the code optimizing module 123 may determine/access the one or more code reference segments based one on one or more characteristics of the one or more code segments. For example, the one or more code segments may include certain functions, certain processing capability, certain code format, certain optimization parameters, and the like, wherein the one or more reference code segments may include similar characteristics.

In step 409, the code optimizing module 123 processes and/or facilitates a processing of the one or more reference code segments to cause, at least in part, a generation of one or more reference privacy intrusion signatures. In one embodiment, the code optimizing module 123 may execute and/or analyze the one or more reference code segments for generating one or more reference privacy intrusion signatures. For example, the one or more reference code segments may be simulated or may be analyzed via a binary code analyzer for generating the one or more reference privacy intrusion signatures.

In step 411, the code optimizing module 123 causes, at least in part, a comparison of the at least one privacy intrusion signature against the one or more reference privacy intrusion signatures. For example, various code segments may be associated with various privacy intrusion signatures based, at least in part, on access, utilization, storage, and the like parameters associated with each code segment. In one instance, the one or more code privacy intrusion signatures are compared to the one or more reference privacy intrusion.

In step 413, the code optimizing module 123 determines the one or more alternate code segments based, at least in part, on the comparison. In one embodiment, the code optimizing module 123 and/or the development platform 109 may determine/select one or more alternate code segments based on one or more comparisons of the one or more code segments with the one or more reference code segments. For example, the comparison may indicate one or more reference code segments that may include better privacy intrusion characteristics (e.g., not as intrusive), may include better performance (e.g., faster), may include certain coding format, and the like.

Referring now to FIG. 5, the process 500 begins in step 501, where the code optimizing module 123 determines one or more potential privacy issues associated with the one or more code segments. In one embodiment, the potential privacy issues may be caused by access and/or request access to certain types of privacy data with certain frequencies, or by one or more indications that the privacy data may be shared with others, or by certain processing of the privacy data, and the like.

In step 503, the code optimizing module 123 causes, at least in part, a presentation of a user interface comprising one or more indicators, one or more messages, or a combination thereof for indicating the one or more potential privacy issues and the associated one or more code segments. In one embodiment, the code optimizing module 123 may utilize one or more markers, indicators, and/or messages to highlight one or more code segments which may be associated with one or more potential privacy issues. For example, one or more portions of a code segment may be highlighted to indicate one or more potential issues, wherein one or more messages (e.g., in text) may provide additional information and/or recommendations.

In step 505, the code optimizing module 123 causes, at least in part, a presentation of the one or more alternate code segments associated with the one or more code segments. In one embodiment, the one or more alternate code segments, for example from the reference code segments, may be presented via a UI component of the code optimizing module 123 along with one or more messages, indicators, notifications, and the like for providing additional assistance to the user.

In step 507, the code optimizing module 123 determines one or more inputs from a user to substantially automatically replace the one or more code segments with the one or more alternate code segments. In one embodiment, a UI element of the code optimizing module 123 may determine an input from the user, for example via a keyboard interface, a selection of one or more alternate code segments, wherein the code optimizing module 123 may substantially automatically replace the one or more code segments with the one or more alternate code segments. For example, a user may decide to replace a code segment with an alternate code segment wherein the functionalities of the codes will produce similar results in an application. In one embodiment, a user may select to replace the one or more code segments interactively with the code optimizing module 123.

In step 509, the code optimizing module 123 causes, at least in part, an association of one or more privacy scores with the one or more alternate code segments based, at least in part, on one or more intrusiveness levels associated with the one or more code segments. In one embodiment, the code optimizing module 123 may determine one or more privacy scores for the one or more alternate code segments by executing and/or analyzing the one or more alternate code segments. For example, an alternate code segment may be assigned a different privacy score compared to one or more other alternate code segments, wherein the difference in scores may be due to one or more functions associated with the different alternate code segments. For example, a privacy score may be a relative score (e.g., higher, lower, same, etc.), or indicate a better or worse level, or be on a numeric scale (e.g., 1-5), and the like.

In step 511, the code optimizing module 123 determines the one or more recommendations based, at least in part, on the one or more privacy scores. For example, the code optimizing module 123 may select and recommend one or more alternate code segments based on the privacy scores of each alternate code. In one embodiment, the selection may be determined by one or more parameters associated with an application which will utilize the one or more alternate code segments.

Figure 6:
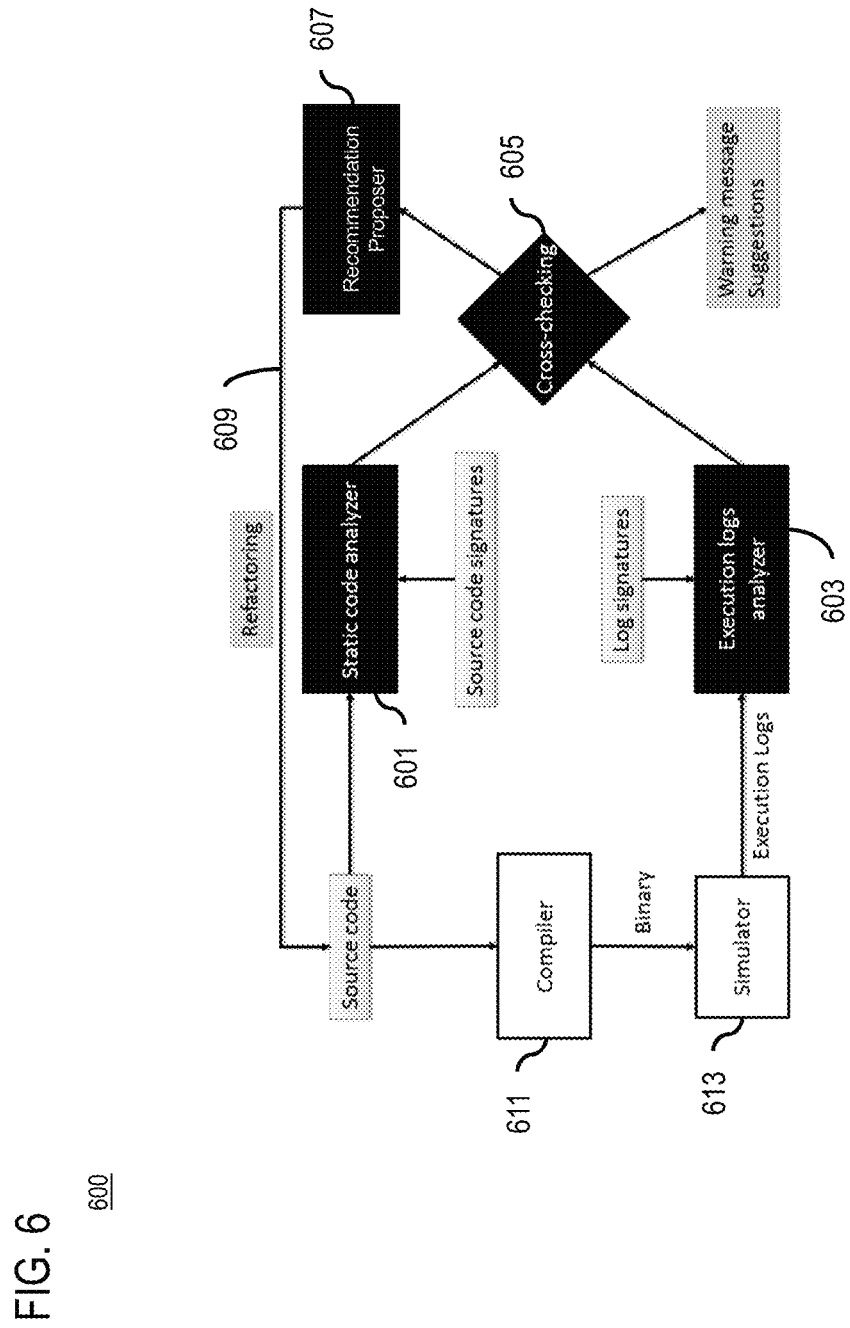
FIG. 6 depicts a schematic diagram of a privacy-oriented automatic code optimizing module, according to an embodiment.

FIG. 6 depicts a schematic diagram of a privacy-oriented automatic code optimizing module, according to an embodiment. In one embodiment, the privacy-oriented automatic code optimizing module 123 includes a static code analyzer 601, an execution logs analyzer 603, a cross-checking module 605, a recommendation proposer 607, and a feedback loop 609. In one embodiment, the feedback loop 609 includes one or more processes, for example refactoring, for substantially automatically replacing one or more code segments. In one embodiment, one or more components of an IDE accesses source code of one or more applications, wherein one or more segments of the source code are, for example, statically analyzed by the static code analyzer 601. Further, the one or more code segments are compared at the cross-checking module 605 against one or more databases of signatures associated with the one or more code segments and/or API functions. In one embodiment, the source code may be compiled by compiler 611 and the resulting binary code may be executed by simulator 613, wherein one or more benchmarks maybe utilized. Furthermore, resulting execution logs are provided to execution logs analyzer 603, where it may be compared against a database of execution logs signatures.

In various embodiments, the cross-checking module 605 may utilize various processes, for example, the source code is processed and analyzed, or the execution logs are processed and analyzed, or a combination thereof. In one embodiment, resulting outputs from the static code analyzer 601 and the execution logs analyzer 603 may be analyzed by the cross-checking module 605, where one or more alternate code segment recommendations may be generated for addressing one or more potential privacy issues.

In one embodiment, the source code analyzer 601 may analyze (static analysis) one or more code segments to seek function calls with potential privacy issues (e.g., suboptimal calls) where the potential associated code segments (e.g., pointers to such functions calls) may be input to the cross-checking module 605. Further, dynamic analysis is performed until the execution reaches the previously identified suboptimal privacy call associated with the potential privacy issues. In one embodiment, if the two analyses (static and dynamic) detect one or more potential suboptimal privacy function calls; for example, an API call that is overly precise for the task being executed, or an oversampling of a given sensor such as GPS, etc., a warning, an indicator, and/or suggestion message may be displayed to the developer including one or more alternate code segment recommendations.

In one embodiment, the execution logs analyzer 603 may analyze (e.g., scan) available execution logs searching for potentially privacy-sensitive function calls and patterns (e.g., may be obtained from log signatures). Further, one or more code segments and/or block of code segments may be linked to corresponding entries in the execution logs, which may be mapped to one or more privacy scores. If a privacy-intrusive pattern (e.g., privacy data access issues) is identified, the source code is further parsed until related code segments are identified, wherein upon identification, the source code analyzer is executed again, for example with a more stringent privacy threshold for sensitive API calls, and if the static analysis determines any potential privacy issues (i.e., overly privacy-intrusive) in the one or more code segments, one or more appropriate warnings and/or recommendation messages for alternate code segments may be presented to the developer. In one embodiment, privacy scores may be determined for the original source code segments and for the potential alternate code segments, wherein if the alternate code segments have better privacy intrusion scores, then one or more messages and/or indicators may be presented to the developer providing the recommended code segments as well as information on any functionality differences whereby the developer may choose to interactively or automatically replace the original code segments with one or more of the recommended code segments.

Figure 7A:
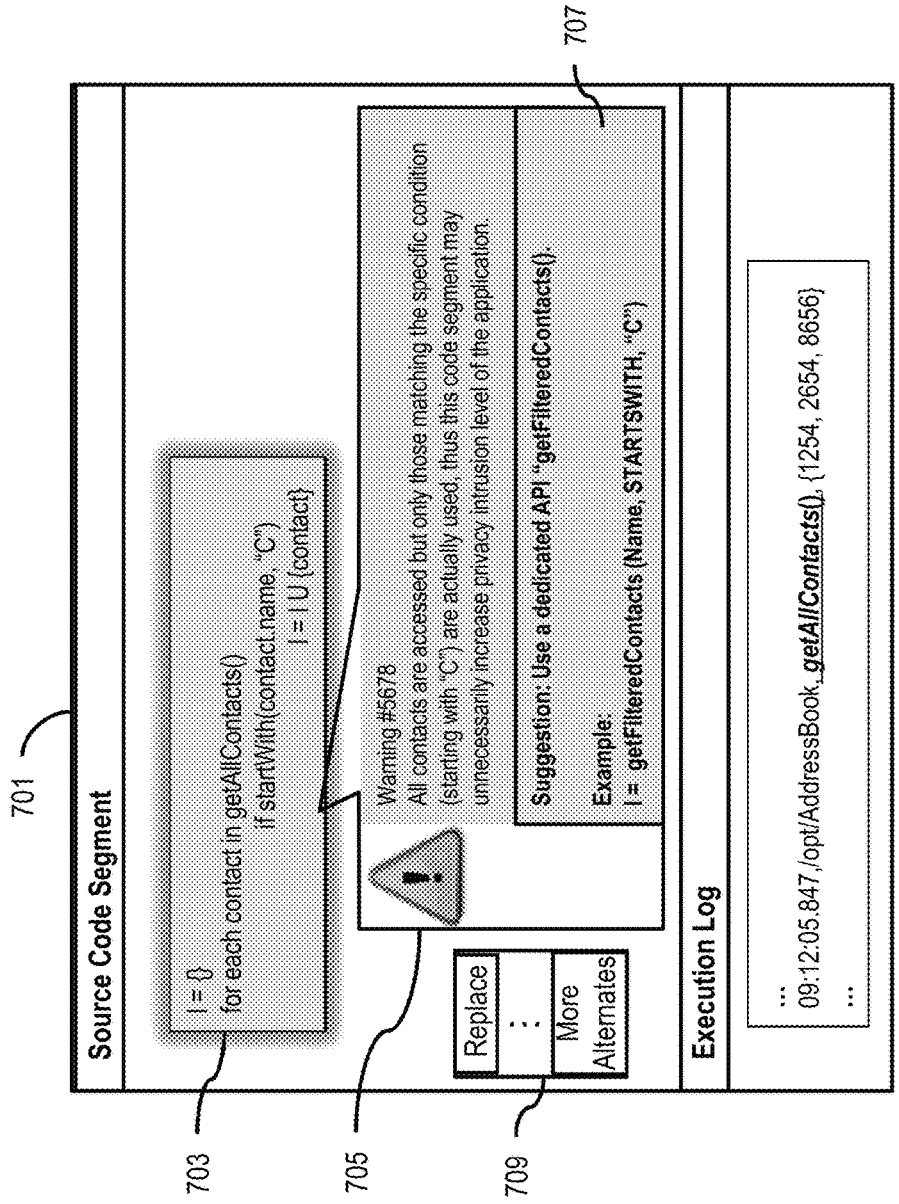
FIGS. 7A-7C depict user interface illustrations for providing information and detecting user interaction, according to various embodiments.
Figure 7B:
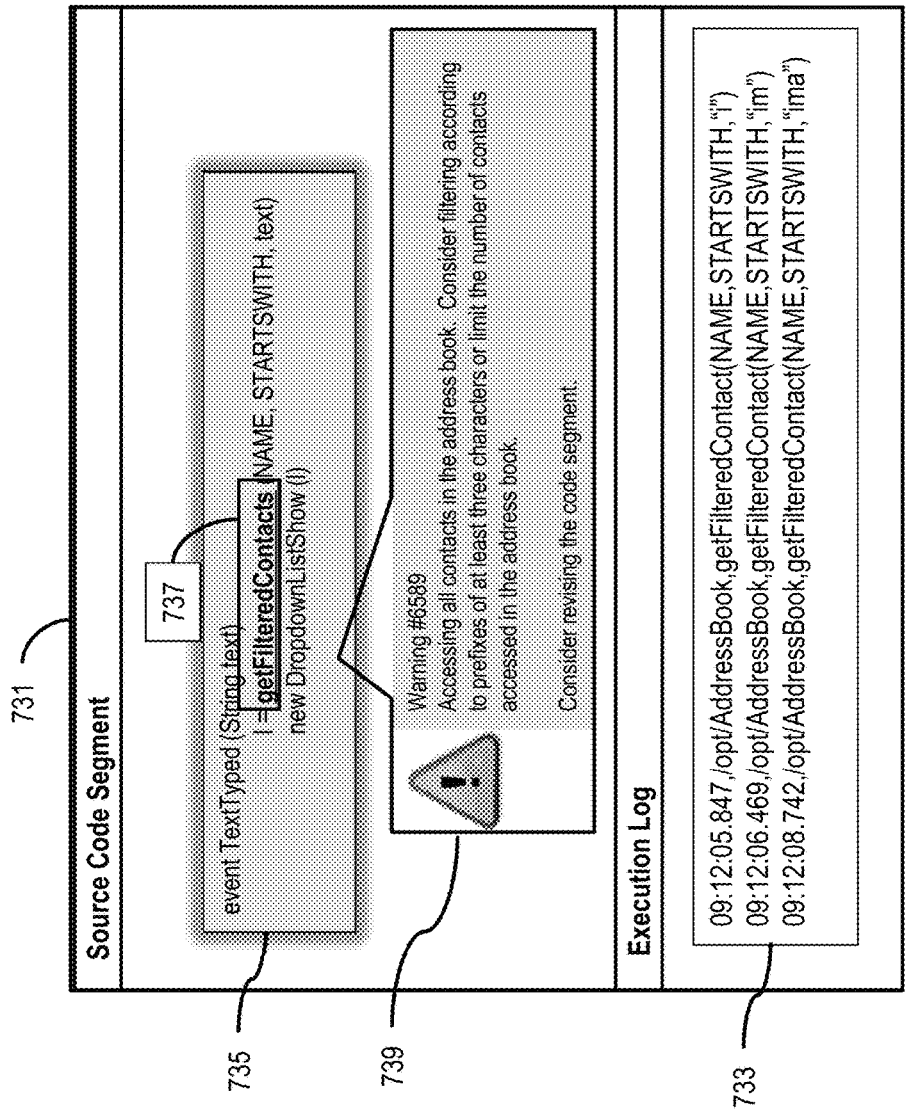
Figure 7C:
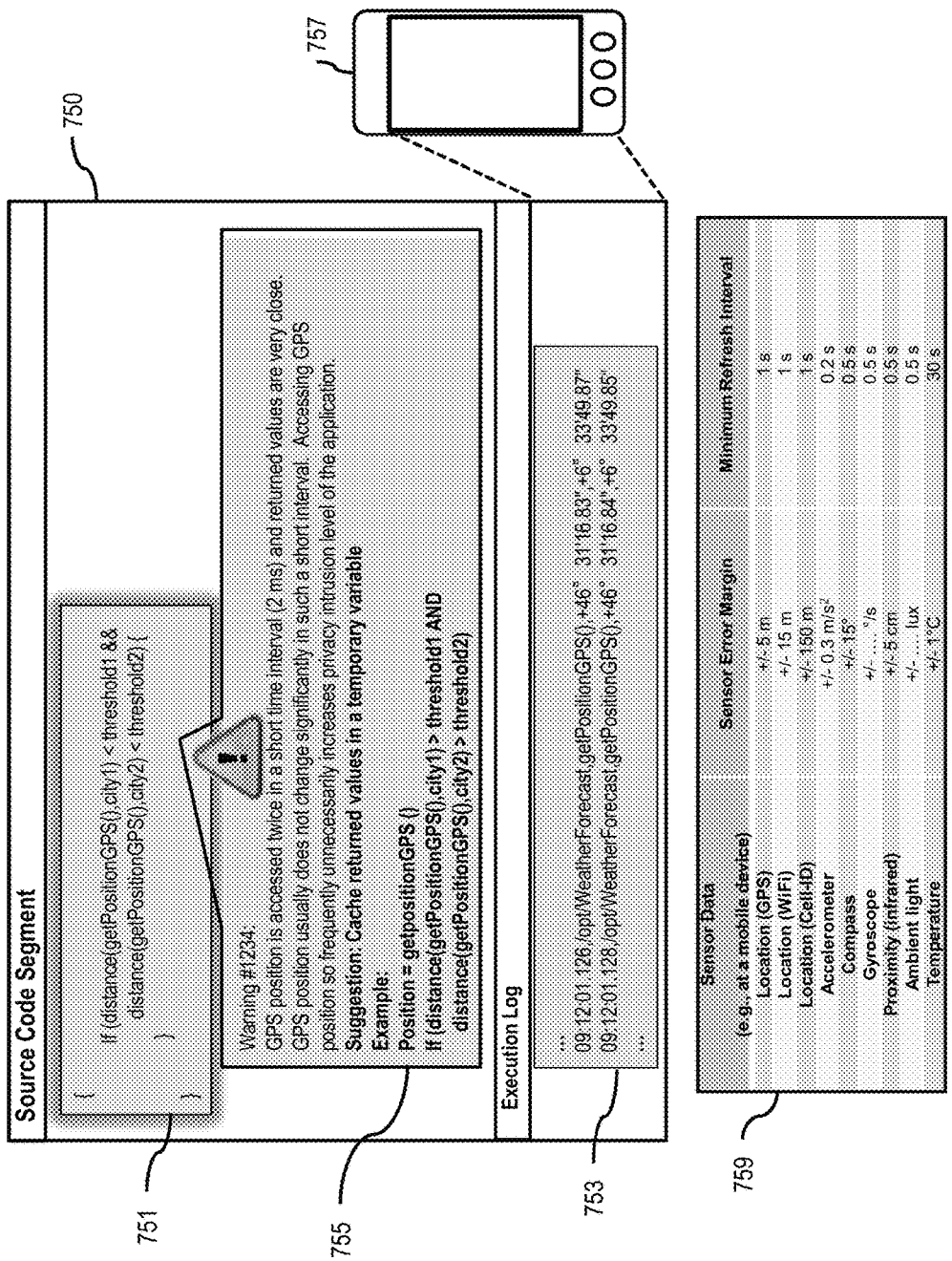

FIGS. 7A-7C depict user interface illustrations for providing information and detecting user interaction, according to various embodiments.

FIG. 7A shows example UI 701 where in one embodiment, code optimizing module 123 may analyze one or more code segments 703 for determining one or more potential privacy issues associated with one or more functions of the code segments. In one instance, an example application may include a code segment for extracting contacts from a contacts list (e.g., in a mobile phone) whose names start with a "C", wherein the code segment may access and/or request access to all the contacts in the list and then filtering/sorting the contacts as follows:

```
l = { }
for each contact in getAllContacts( )
    if startWith(contact.name, "C")
        l = l U {contact}
```

In one embodiment, utilizing static processing and analysis of the source code segment, it can be detected that, (1) the code segment 703 causes generation of the list "1" containing all contact names whose names begin with a "C", (2) only the contacts in "1" are used from the results, and (3) all contacts from a contacts list are accessed by an application utilizing the code segment 703, wherein the function of the code segment may be determined as an unnecessary that can increase privacy intrusion level for the application. In one embodiment, a warning message/indicator and one or more alternate code segment may be presented via UI element 705 to the developer. In one embodiment, the code optimizing module 123 can determine that signature of the code segment 703 may be similar to that of an alternate code segment 707, for example an API function call "getFiltered Contacts( )" yielding an alternate code segment of "l=get-FilteredContacts (NAME, STARTSWITH "C")." Further, the developer may select, via UI options 709, to automatically or interactively replace the original code segment 703 with the alternate code, request for more alternate code segments, perform further analysis, and the like.

FIG. 7B shows example UI 731 where in one embodiment, the code optimizing module 123 may determine and analyze an execution log signature 733 of code segment 735 including function call 737 "getFilteredContacts( )." In one example, the function call 737 may be utilized to implement an auto-completion feature for selecting a contact from a user's address book based on names therein (e.g., while the user starts typing a string, the user's contacts whose names start with this string are displayed), which can be achieved with the following code segment:

```
event TextTyped(String text)
    l = getFilteredContacts(NAME, STARTSWITH, text)
    new DropdownListShow(l)
```

In one example, the execution log 733 may include the following:

```
09:12:05.847,/opt/AddressBook,getFilteredContact(NAME,STARTSWITH, "i")
09:12:06.469,/opt/AddressBook,getFilteredContact(NAME,STARTSWITH, "im")
09:12:08.742,/opt/AddressBook,getFilteredContact(NAME,STARTSWITH, "ima")
```

Further, analyzing the logs, the code optimizing module 123 can detect that a sequence of filtered accesses to the address book have been made where each prefix differing from a previous one by only one letter. In one embodiment, the code optimizing module 123 may present a warning and/or informative message 739 to the developer to recommend one or more alternate code segments, suggestions to improve privacy intrusion level for example, by use of dedicated API functions, whereby only a contact name/information selected by a user is provided to the application, or by filtering according to prefixes of at least three characters or limit the number of contacts accessed in the address book.

FIG. 7C depicts UI 750 where in one embodiment, the code optimizing module 123 may process and analyze code segment 751:

```
If (distance(getPositionGPS( ),city1) > threshold1 AND
    distance(getPositionGPS( ),city2) > threshold2)
``` where it can be detected that a GPS position (e.g., of a user/device) is requested twice. Further, corresponding execution logs 753 calls may be analyzed and cross-checked to determine, for example, an average time (e.g., over several simulation executions) between the two requests and an average distance between the two returned values, wherein simulation execution parameters may be determined and controlled by the developer via a controller 757. In one embodiment, a message 755 including a warning, an indicator, alternate code segment, alternate function call, and the like may be presented to the developer, for example, a solution may recommend to cache results of a function call in a variable. In this example of FIG. 7C, one or more characteristics of a GPS positioning sensor are utilized, for example, measurement error margin and the minimum refresh interval. In various embodiments, same method of analysis and recommendation may be applied to other positioning techniques (e.g., WiFi, cell-trilateration, etc.) and/or other sensors (e.g., compass, gyroscope, etc.) as listed in example table 759.

In some embodiments, applications may require location information from a user device (e.g., mobile device), where the returned information (e.g., GPS values) may include excess information uncritical for the application purpose. A privacy-oriented code optimizing module may assist application developers to monitor and improve source code and functions of an application by detecting excessive and unnecessary access to privacy data of a user and/or a device. For example, an application may request location information so it can make certain changes to a user/device profile (e.g., ringtone/vibrate, wallpaper, locking etc.), which may be based on whether the user is at home, or at work. Providing the application precise GPS coordinates can be excessive information whereas "home" and "work" would be sufficient for proper application functionality. Instead of utilizing a code segment or a function call that would provide the applications exact GPS coordinates, the proposed privacy-oriented code optimizing module would present the developer with an alternate code segment and/or function call that returns specific location tags (e.g. "home", "work", "gym", "bar" etc.). As such, the application may privacy intrusion may be improved while it functionality remains substantially same and acceptable to the user.

The processes described herein for automatically optimizing application program code for minimized access to privacy data may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
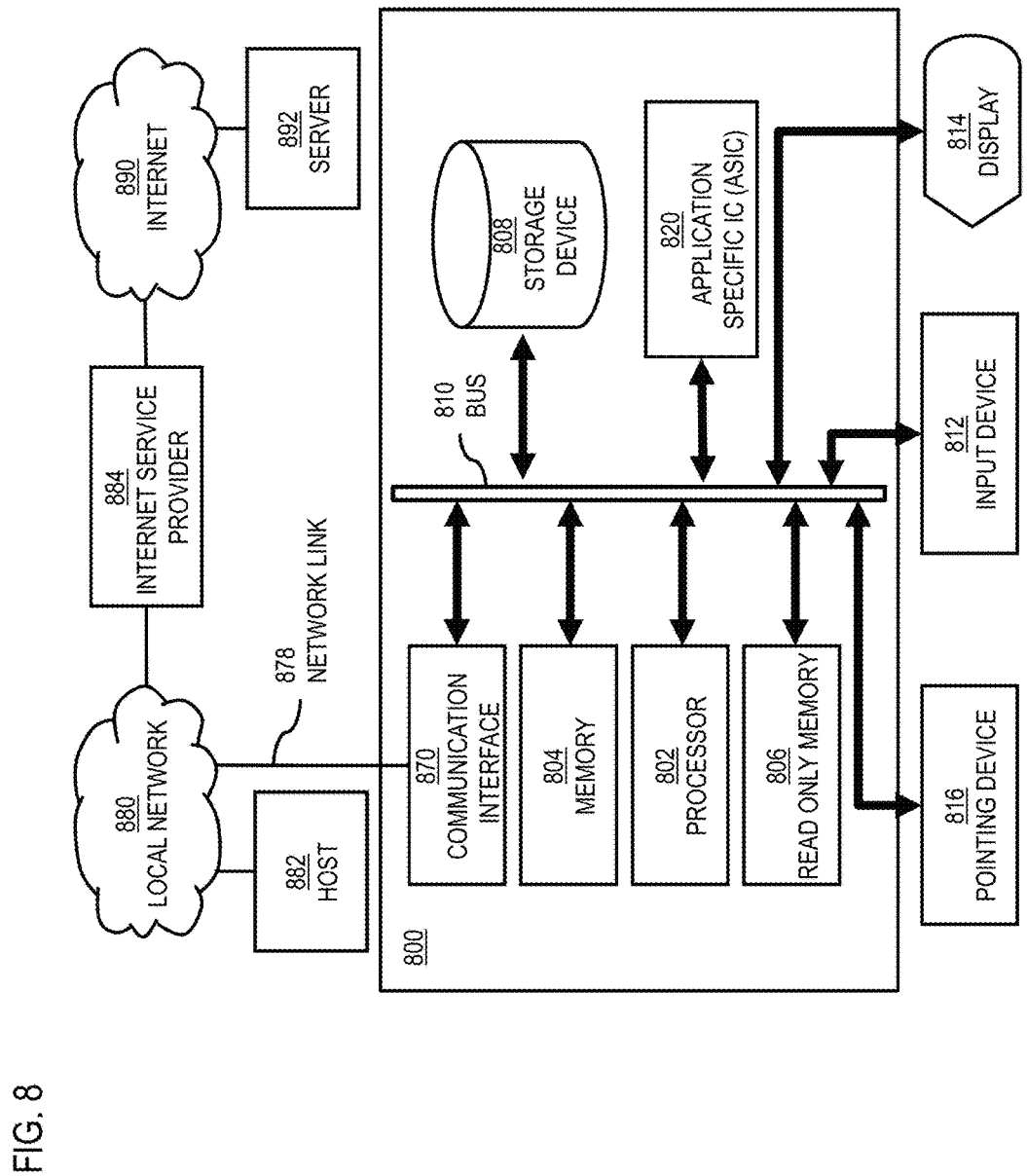
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to automatically optimize application program code for minimized access to privacy data as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of automatically optimizing application program code for minimized access to privacy data.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to automatically optimizing application program code for minimized access to privacy data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for automatically optimizing application program code for minimized access to privacy data. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for automatically optimizing application program code for minimized access to privacy data, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814, and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners, and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic, or electromagnetic signals, including infrared and optical signals that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 113 for automatically optimizing application program code for minimized access to privacy data.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880, and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to automatically optimize application program code for minimized access to privacy data as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of automatically optimizing application program code for minimized access to privacy data.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein for automatically optimizing application program code for minimized access to privacy data. The memory 905 also stores the data associated with or generated by the execution of the inventive steps.

Figure 10:
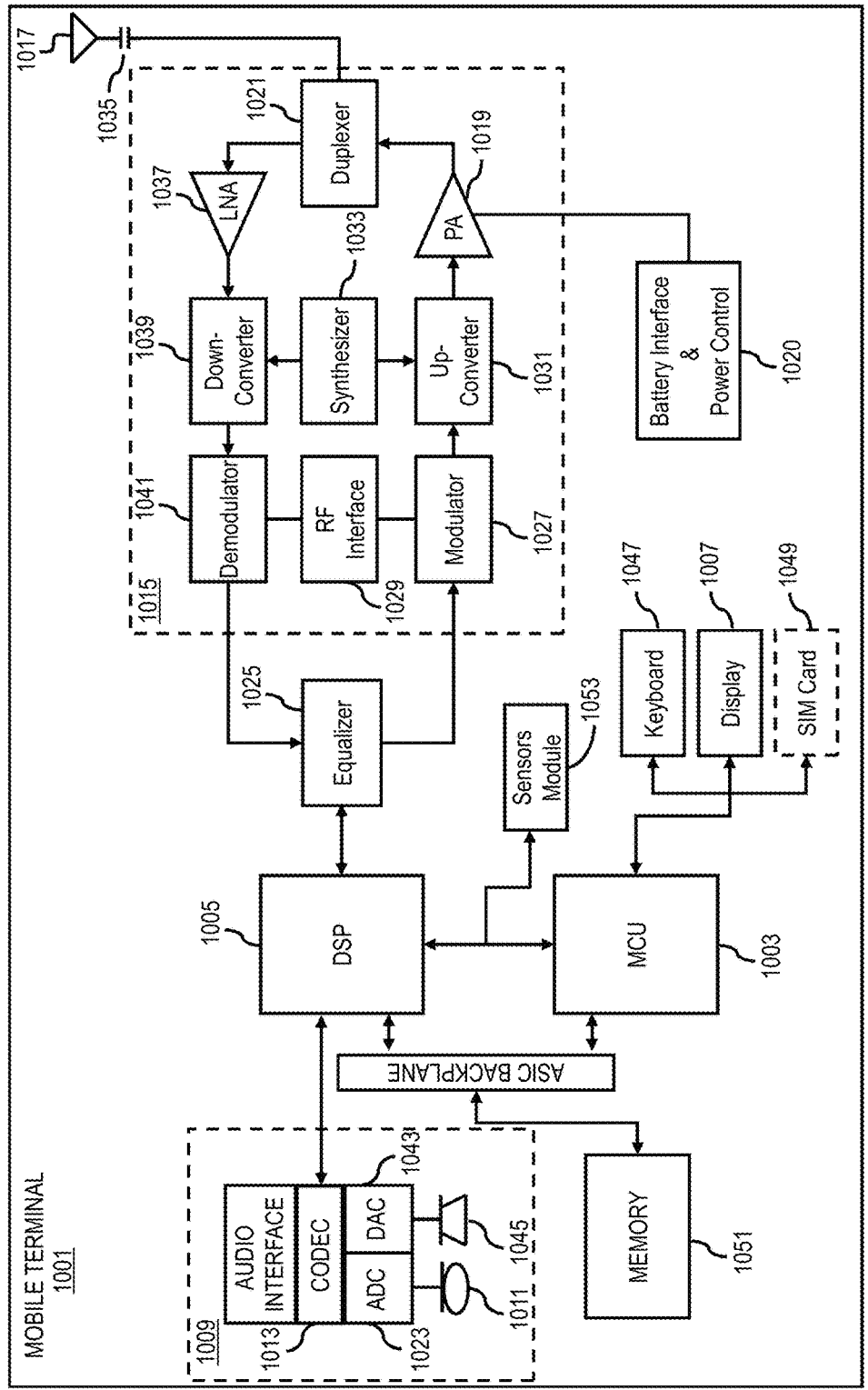
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of automatically optimizing application program code for minimized access to privacy data. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of automatically optimizing application program code for minimized access to privacy data. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 for automatically optimizing application program code for minimized access to privacy data. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

Additionally, sensors module 1053 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1001 (e.g., a mobile phone), a user of the mobile terminal 1001, an environment of the mobile terminal 1001 and/or the user, or a combination thereof, wherein the data may be collected, processed, stored, and/or shared with one or more components and/or modules of the mobile terminal 1001 and/or with one or more entities external to the mobile terminal 1001.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for optimizing an application with less access to privacy data stored on a user device, comprising:
    processing, by an apparatus, one or more code segments, one or more execution logs associated with the one or more code segments, or a combination thereof to determine at least one privacy intrusion signature when developing the one or more code segments for the application being developed for the user device;
    calculating, by the apparatus, a privacy score for the at least one privacy intrusion signature based, at least in part, on one or more intrusiveness levels of the one or more code segments using one or more re-accesses frequencies, one or more granularity levels, or a combination thereof associated with the privacy data stored on the user device accessed by the one or more code segments;
    calculating, by the apparatus, a privacy score for one or more alternate code segments associated with one or more application programming interface functions that are available to the user device for executing the application in place of the at least one privacy intrusion signature; and determining, by the apparatus, one or more recommendations of at least one of the alternate code segments for the developing based, at least in part, on that the privacy score of the at least one privacy intrusion signature is lower than a privacy score of the at least one of the alternate code segments.

2. A method of claim 1, further comprising:
determining one or more code patterns in the one or more code segments,
wherein the one or more code patterns are associated with privacy data stored on the user device accessed by the application; and
wherein the at least one privacy intrusion signature is based, at least in part, on the one or more code patterns.

3. A method of claim 2, wherein the one or more alternate code segments cause, at least in part, one or more alterations in the processing of the privacy data, collecting of the privacy data, storing of the privacy data, accessing of the privacy data, parsing of the privacy data, granularity of the privacy data, or a combination thereof.

4. A method of claim 1, further comprising:
initiating a simulation of an execution of the one or more code segments to generate the one or more execution logs;
determining one or more access patterns in the one or more execution logs,
wherein the one or more access patterns are associated with one or more privacy data accesses; and
wherein the at least one privacy intrusion signature is based, at least in part, on the one or more access patterns.

5. A method of claim 1, further comprising:
determining one or more reference code segments based, at least in part, on one or more characteristics of the one or more code segments; and
processing the one or more reference code segments to cause, at least in part, a generation of one or more reference privacy intrusion signatures.

6. A method of claim 5, further comprising:
initiating a comparison of the at least one privacy intrusion signature against the one or more reference privacy intrusion signatures; and
determining the one or more alternate code segments based, at least in part, on the comparison.

7. A method of claim 1, wherein the one or more recommendations are determined based, at least in part, on one or more privacy rules associated with one or more users, one or more service providers, one or more content providers, or a combination thereof.

8. A method of claim 1, further comprising:
determining one or more potential privacy issues associated with the one or more code segments, based, at least in part, on an identification of one or more function calls accessing privacy data stored on the user device; and
initiating a presentation of a user interface comprising one or more indicators, one or more messages, or a combination thereof for indicating the one or more potential privacy issues and the associated one or more code segments.

9. A method of claim 8, further comprising:
initiating a presentation of the one or more alternate code segments associated with the one or more code segments; and determining one or more inputs received at the user device to substantially automatically replace the one or more code segments with the one or more alternate code segments.

10. An apparatus for optimizing an application with less access to privacy data stored on a user device, comprising:
at least one processor; and
at least one memory including computer program code for one or more programs,
the at least one memory and the computer program code configured to, with the at least one processor, cause the apparatus to perform at least the following,
process one or more code segments, one or more execution logs associated with the one or more code segments, or a combination thereof to determine at least one privacy intrusion signature when developing the one or more code segments for the application being developed for the user devices;
calculate a privacy score for the at least one privacy intrusion signature based, at least in part, on one or more intrusiveness levels of the one or more code segments using one or more re-accesses frequencies, one or more granularity levels, or a combination thereof associated with the privacy data stored on the user device accessed by the one or more code segments;
calculate a privacy score for one or more alternate code segments associated with one or more application programming interface functions that are available to the user device for executing the application in place of the at least one privacy intrusion signature; and
determine one or more recommendations of at least one of the alternate code segments for the developing based, at least in part, on that the privacy score of the at least one privacy intrusion signature is lower than a privacy score of the at least one of the alternate code segments.

11. An apparatus of claim 10, wherein the apparatus is further caused to:
determine one or more code patterns in the one or more code segments,
wherein the one or more code patterns are associated with privacy data stored on the user device accessed by the application; and
wherein the at least one privacy intrusion signature is based, at least in part, on the one or more code patterns.

12. An apparatus of claim 11, wherein the one or more alternate code segments cause, at least in part, one or more alterations in the processing of the privacy data, collecting of the privacy data, storing of the privacy data, accessing of the privacy data, parsing of the privacy data, granularity of the privacy data, or a combination thereof.

13. An apparatus of claim 10, wherein the apparatus is further caused to:
initiate a simulation of an execution of the one or more code segments to generate the one or more execution logs;
determine one or more access patterns in the one or more execution logs,
wherein the one or more access patterns are associated with one or more privacy data accesses; and
wherein the at least one privacy intrusion signature is based, at least in part, on the one or more access patterns.

14. An apparatus of claim 10, wherein the apparatus is further caused to:

determine one or more reference code segments based, at least in part, on one or more characteristics of the one or more code segments; and process the one or more reference code segments to cause, at least in part, a generation of one or more reference privacy intrusion signatures.

15. An apparatus of claim 14, wherein the apparatus is further caused to:

initiate a comparison of the at least one privacy intrusion signature against the one or more reference privacy intrusion signatures; and determine the one or more alternate code segments based, at least in part, on the comparison.

16. An apparatus of claim 10, wherein the one or more recommendations are determined based, at least in part, on one or more privacy rules associated with one or more users, one or more service providers, one or more content providers, or a combination thereof.

17. An apparatus of claim 10, wherein the apparatus is further caused to:

determine one or more potential privacy issues associated with the one or more code segments, based, at least in part, on an identification of one or more function calls accessing privacy data stored on the user device; and initiate a presentation of a user interface comprising one or more indicators, one or more messages, or a combination thereof for indicating the one or more potential privacy issues and the associated one or more code segments.

18. An apparatus of claim 17, wherein the apparatus is further caused to:

initiate a presentation of the one or more alternate code segments associated with the one or more code segments; and determine one or more inputs received at the user device to substantially automatically replace the one or more code segments with the one or more alternate code segments.

19. A method for optimizing an application with less access to privacy data stored on a user device, comprising:

processing, by an apparatus, one or more code segments, one or more execution logs associated with the one or more code segments, or a combination thereof to determine at least one privacy intrusion signature when developing the one or more code segments for the application being developed for the user device;

calculating, by the apparatus, a privacy score for the at least one privacy intrusion signature based, at least in part, on one or more intrusiveness levels of the one or more code segments using one or more re-accesses frequencies, one or more granularity levels, or a combination thereof associated with the privacy data stored on the user device accessed by the one or more code segments;

calculating, by the apparatus, a privacy score for one or more alternate code segments associated with one or more application programming interface functions that are available to the user device for executing the application in place of the at least one privacy intrusion signature; and determining, by the apparatus, one or more recommendations of at least one of the alternate code segments for the developing based, at least in part, on that the privacy score of the at least one privacy intrusion signature is higher than a privacy score of the at least one of the alternate code segments.

20. An apparatus for optimizing an application with less access to privacy data stored on a user device, comprising:

at least one processor; and at least one memory including computer program code for one or more programs, the at least one memory and the computer program code configured to, with the at least one processor, cause the apparatus to perform at least the following, process one or more code segments, one or more execution logs associated with the one or more code segments, or a combination thereof to determine at least one privacy intrusion signature when developing the one or more code segments for the application being developed for the user devices;

calculate a privacy score for the at least one privacy intrusion signature based, at least in part, on one or more intrusiveness levels of the one or more code segments using one or more re-accesses frequencies, one or more granularity levels, or a combination thereof associated with the privacy data stored on the user device accessed by the one or more code segments;

calculate a privacy score for one or more alternate code segments associated with one or more application programming interface functions that are available to the user device for executing the application in place of the at least one privacy intrusion signature; and determine one or more recommendations of at least one of the alternate code segments for the developing based, at least in part, on that the privacy score of the at least one privacy intrusion signature is higher than a privacy score of the at least one of the alternate code segments.

* * * * *